(12) United States Patent
Heuser et al.

(10) Patent No.: US 7,495,849 B2
(45) Date of Patent: Feb. 24, 2009

(54) KINEMATIC OPTICAL MOUNT

(75) Inventors: Michael Heuser, Rancho Santa Margarita, CA (US); Thomas Rigney, Silverado, CA (US)

(73) Assignee: Newport Corporation, Irvine, CA (US)

( * ) Notice: Subject to any disclaimer, the term of this patent is extended or adjusted under 35 U.S.C. 154(b) by 210 days.

(21) Appl. No.: 11/655,677

(22) Filed: Jan. 19, 2007

(65) Prior Publication Data
US 2007/0169310 A1    Jul. 26, 2007

Related U.S. Application Data

(60) Provisional application No. 60/760,833, filed on Jan. 20, 2006.

(51) Int. Cl.
*G02B 7/02* (2006.01)
(52) U.S. Cl. .......................... 359/819; 359/808; 359/811
(58) Field of Classification Search .................. 359/819
See application file for complete search history.

(56) References Cited

U.S. PATENT DOCUMENTS 4,685,558 A * 8/1987 Filiz et al. .................... 206/1.5
6,070,749 A * 6/2000 Joulia ......................... 220/4.22

* cited by examiner

*Primary Examiner*—Ricky L Mack
*Assistant Examiner*—James C Jones
(74) *Attorney, Agent, or Firm*—Brian F. Swienton

(57) ABSTRACT

The present application disclosed various embodiments of kinematic optical mounts which include a first body member having at least one hinge extension defining at least one hinge passage extending therefrom and a mount surface configured to receive at least one optical component thereon, one or more positioning registers formed on the hinge extension, a second body member having a hinge recess sized to receive the hinge extension therein and at least one coupling body, one or more positioning elements in communication with the second body member and configured to be force biased to engage the positioning registers, and at least one biasing member configured to apply a constant biasing force to one or more hinge bearing members, thereby forcing the bearing members engage at least one bearing engaging member in communication with the second body member thereby coupling the first body member to the second body member.

17 Claims, 5 Drawing Sheets

KINEMATIC OPTICAL MOUNT

The present application claims the benefit of U.S. Provisional Patent App. Ser. No. 60/760,833 filed Jan. 20, 2006.

BACKGROUND

Optical systems typically include one or more optical elements or similar devices supported by one or more optical mounts. The optical mounts position the optical elements at desired location while securing the optical elements to a support substrate. Exemplary support substrates include, without limitation, optical tables, optical benches, platforms, sub-frames, frames, and the like.

While a variety of optical mounts are presently available, a number of shortcomings common to most optical mounts have been identified. For example, repeatable, stable positioning of adjustable optical mount has proven illusive. As such, alignment of an optical system incorporating these mounts is a time consuming endeavor.

In light of the foregoing, there is an ongoing need for an adjustable optical mount capable of securing and adjustably positioning one or more optical elements within an optical beam path.

SUMMARY

The present application disclosed various embodiments of kinematic optical mounts. In one embodiment, the present application discloses a kinematic optical mount and includes a first body member having at least one hinge extension defining at least one hinge passage extending therefrom and a mount surface configured to receive at least one optical component thereon, one or more positioning registers formed on the hinge extension, a second body member having a hinge recess sized to receive the hinge extension therein and at least one coupling body, one or more positioning elements in communication with the second body member and configured to be force biased to engage the positioning registers, and at least one biasing member configured to apply a constant biasing force to one or more hinge bearing members, thereby forcing the bearing members engage at least one bearing engaging member in communication with the second body member thereby coupling the first body member to the second body member.

In another embodiment, the present application is directed to an optical mount and includes a first body member having at least one hinge extension defining at least one hinge passage extending therefrom and a mount surface configured to receive at least one optical component thereon, one or more positioning recesses formed on the hinge extension, a second body member having a hinge recess sized to receive the hinge extension therein and at least one coupling body, one or more positioning elements in communication with the second body member and configured to be force biased to engage the positioning recesses, and at least one biasing member configured to apply a constant biasing force to one or more hinge bearing members, thereby forcing the bearing members engage at least one bearing engaging member in communication with the second body member thereby coupling the first body member to the second body member.

In another embodiment, the present application is directed to an optical mount and includes a first body member having at least one hinge extension and a mount surface, one or more positioning registers formed on the hinge extension, a second body member having a hinge recess sized to receive the hinge extension therein and at least one coupling body, one or more positioning elements in communication with the second body member and configured to be force biased to engage the positioning registers, and at least one biasing member configured to apply a constant biasing force to one or more hinge bearing members, thereby forcing the hinge bearing members engage at least one bearing engaging member in communication with the second body member thereby coupling the first body member to the second body member.

Other features and advantages of the embodiments of kinematic optical mounts as disclosed herein will become apparent from a consideration of the following detailed description.

BRIEF DESCRIPTION OF THE DRAWINGS

Various embodiments of kinematic optical mounts will be explained in more detail by way of the accompanying drawings, wherein.

DETAILED DESCRIPTION

Figure 1:
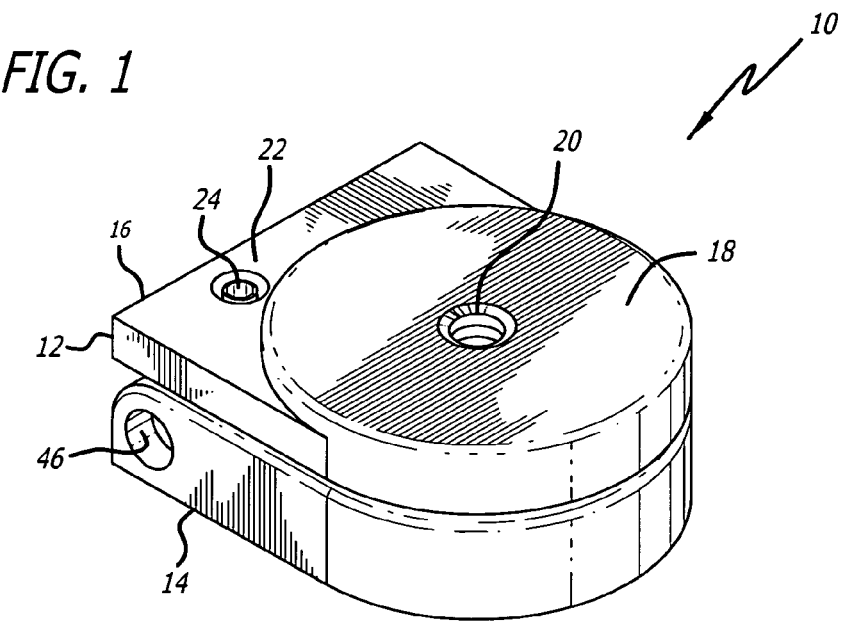
FIG. 1 shows an elevated perspective view of an embodiment of a kinematc optical mount in a closed position wherein the first body member is located adjacent to the second body member.
Figure 2:
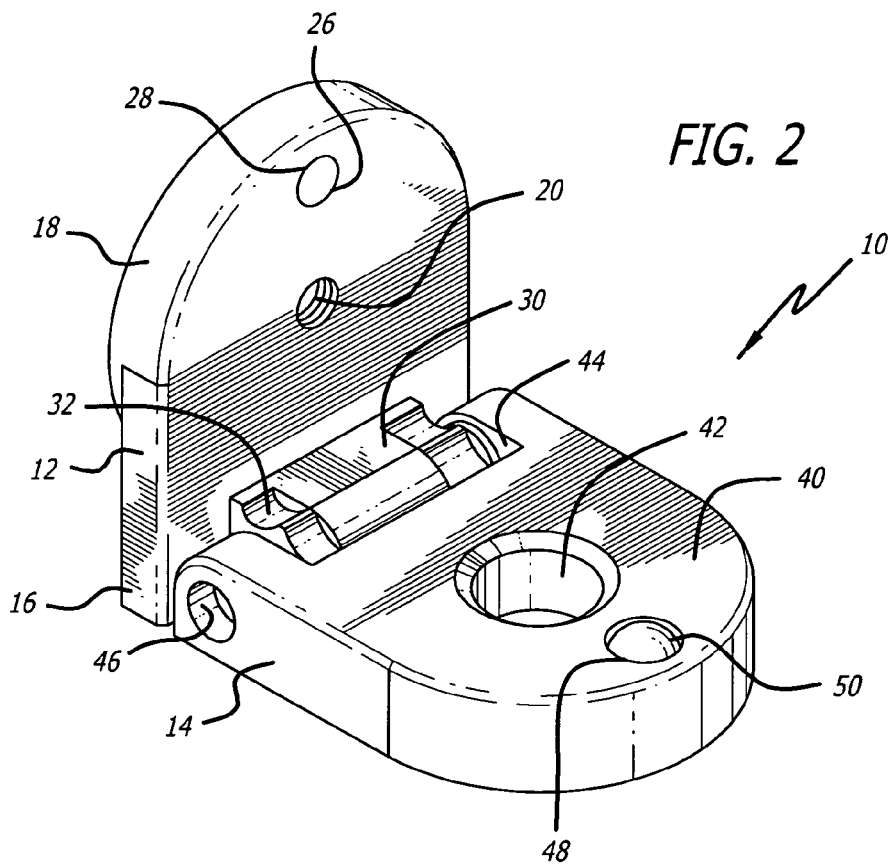
FIG. 2 shows an elevated perspective view of an embodiment of a kinematc optical mount in a open position wherein the first body member is positioned perpendicular to the second body member.

FIGS. 1 and 2 of the present application show an embodiment of a kinematic optical mount. As shown, the optical mount 10 comprises a first body member 12 and a second body member 14. The first body member 12 includes a mount body 16 having at least one mounting surface or area 18 formed thereon. In the illustrated embodiment, the mounting surface 18 includes at least one mounting aperture 20 formed thereon. In an alternate embodiment, the mounting surface 18 does not include a mounting aperture 20 formed thereon. In another embodiment, the mounting surface 18 includes one or more mounting devices or other feature configured to enable at least one optical device to be coupled to the first body member 12. For example, the mounting surface 18 may include one or more pins, tracks, clips, magnetic couplers, thread members, or other couplers attached to or integral therewith and configured to couple one or more optical devices to the first body member 12.

Referring again to FIGS. 1 and 2, in the illustrated embodiment the mount body 16 of the first body member 12 includes at least one fastener orifice 22 formed thereon and configured to receive at least one fastener 24 therein. Referring to FIG. 2, at least one pad member 26 may be positioned within a pad member receiver 28 formed on a surface of the first body member 12. In one embodiment, the pad member 26 may be configured to engage at least a portion of the second body member 14 when the optical mount 10 is in a closed configuration. The pad member 26 may be constructed of any variety of materials, including, without limitation, polymers, elastomers, rubbers, silicon, metals, ceramics, composite materials, natural fibers, and the like. For example, the pad member 26 may comprise a magnetic material.

As shown in FIG. 2, the first body member 12 includes at least one hinge extension 30 coupled to or otherwise integral with a surface of the mount body 16. In the illustrated embodiment, the hinge extension 30 includes one or more positioning registers 32 thereon. In one embodiment, the positioning registers 32 comprise one or more recesses configured to receive one or more positioning elements 58 (See FIG. 3) therein. Optionally, the positioning registers 32 may comprise holes, slits, slots, pins, balls, inductive bodies, cylindrical body and the like configured to engage the positioning elements 58. As such, the first body member 12 of the optical mount 10 may be positionable at a variety of pre-determined or registered angles relative to the second body member 14. Optionally, the positioning registers 32 may be formed on the first body member 12.

Referring again to FIGS. 1 and 2, the second body member 14 includes a coupling body 40 having at least one coupling orifice 42 formed therein. The coupling orifice 42 may be configured to receive at least one fastener therein thereby permitting the optical mount 10 to be coupled to an optical support or other device. As such, the coupling orifice 42 may comprise a threaded or non-threaded member configured to receive at least one fastening device therein. Optionally, the coupling body 40 may be manufactured without a coupling orifice formed therein.

Referring again to FIGS. 1 and 2, the coupling body 40 further includes at least one hinge recess 44 formed therein. The hinge recess 44 may be sized to receive the hinge extension 30 of the first body member 12 therein. As shown in FIGS. 1 and 2, at least one hinge coupling orifice 46 is formed in the coupling body 40 of the second body member 14. In the illustrated embodiment the hinge coupling orifice 46 is positioned proximate to the hinge recess 44. Optionally, the hinge coupling orifice 46 may be positioned anywhere on the coupling body 40 of the second body member 14. In another embodiment, the coupling body 40 may be manufactured without the hinge coupling orifice 46.

As shown in FIG. 2, the second body member 14 may include a pad recess 48 configured to receive and retain at least one pad member 50 therein. Exemplary pad members include, without limitation, bearings, flat plates, cupped members, magnets, and the like. The pad member 50 may be manufactured from any variety of materials including, without limitation, metal, polymers, elastomers, ceramics, composite materials, alloys, and the like. In one embodiment, the pad member 50 positioned on the second body member 50 is configured to engage the pad member 26 located on the first body member 12 when the optical mount 10 is in a closed position.

Figure 3:
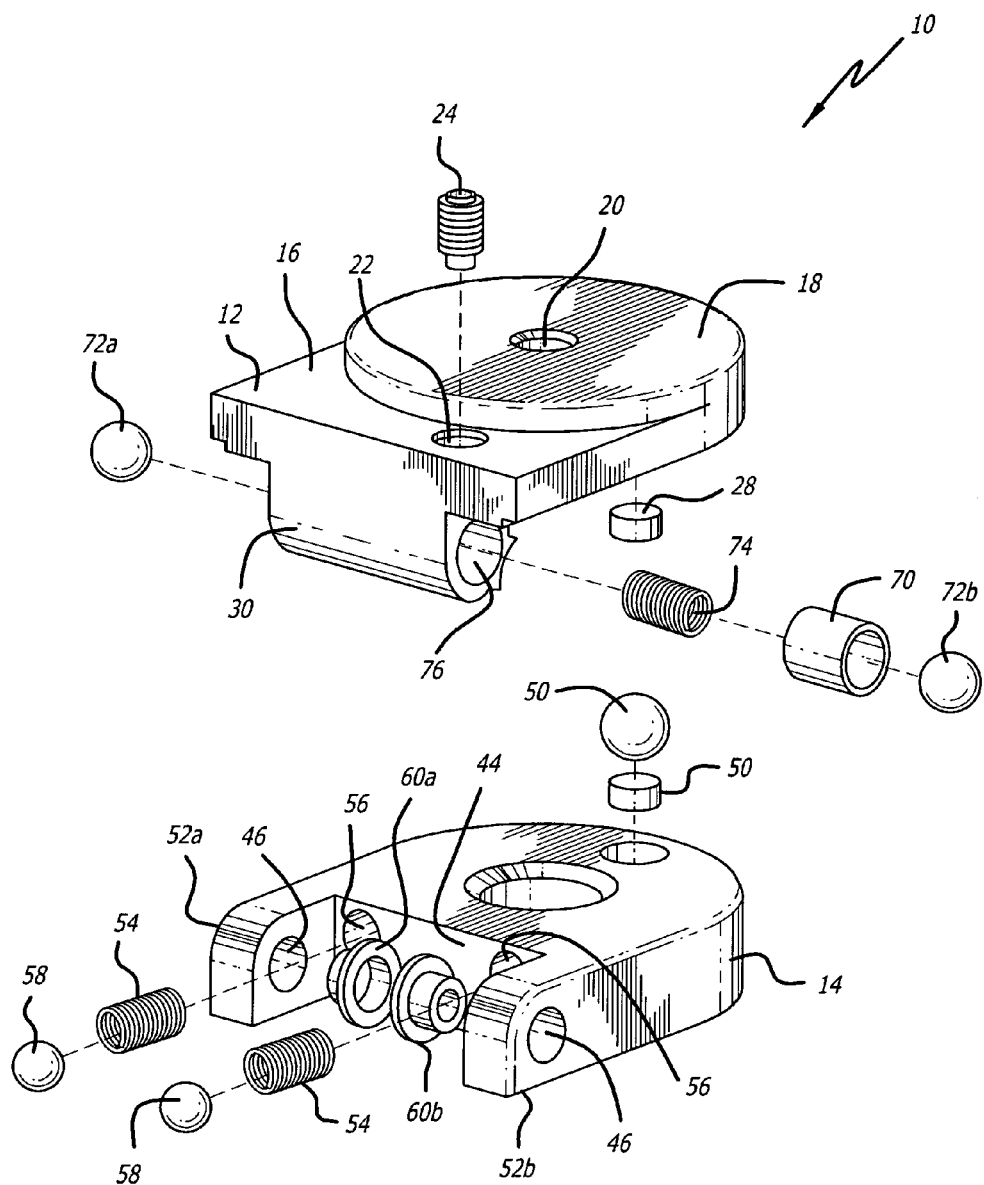
FIG. 3 shows an exploded elevated perspective view of an embodiment of a kinematic optical mount.

FIG. 3 of the present application shows an exploded view of an embodiment of an optical mount. As shown, the second body member 14 may include a first hinge relief member 52a and a second hinge relief member 52b which, with the coupling body 40, cooperatively form the hinge recess 44. One or more hinge coupling recesses 46 may be formed on the first hinge relief member 52a, the second hinge relief member 52b, or both. Further, one or more biasing member passages 56 may be formed within the hinge recess 44. The biasing member recess 56 may be configured to receive at least one biasing member 54 and at least one positioning element 58 therein. Once assembled, the biasing member 54 and positioning element 58 positioned within the biasing member passage 56 are configured to engage the positioning register 32 formed on the hinge extension 30, thereby permitting the user to position the first body 12 at a selected angle relative to the second body member 14 during use. In one embodiment, the positioning element 58 comprises a bearing configured to engage the positioning registers 32 formed on the hinge extension 30. Optionally, any variety of positioning elements 58 may be used to engage the positioning registers 32 formed on the hinge extension 30, including, without limitation, pins, rods, angled members, magnetic elements, extensions, and the like.

One or more bearing engaging members may be positioned proximate to the positioning bearings 58 and the hinge relief members 52a, 52b. For example, in one embodiment a first bearing engaging member 60a is positioned between a first hinge bearing 72a and the first hinge relief member 52a when the device is assembled. Similarly, a second bearing engaging member 60b is positioned between a second hinge bearing 72b and the second hinge relief member 52b when the device is assembled. In the illustrated embodiment the bearing engaging members 60a, 60b comprise conical bearing seats configured to receive the hinge bearings 72a, 72b therein. Optionally, the bearing engaging members 60a, 60b may comprise any variety of devices configured to provide at least three points of contact between the hinge bearings 72a, 72b and the second body member 14. Exemplary alternate devices include, without limitation, spherical bearings receivers, cylindrical bearing receivers, and the like. Referring again to FIG. 3, one or more bearing member receivers may be positioned within the hinge recess 44. In the illustrated embodiment, a first bearing member receiver 52a is positioned proximate to the coupling recess 46 formed on the first hinge relief member 52a. Similarly, a second bearing member receiver 52b is positioned proximate to the coupling recess 46 formed on the second hinge relief member 52b.

As shown in FIG. 3, at least one lock sleeve 70 configured to receive at least one hinge bearing 72 and at least one biasing member 74 therein may be positioned within at least one hinge passage 76 formed within the hinge extension 30 formed on the first body member 12. In one embodiment, the hinge passage 76 traverses the length of the hinge extension formed on the first body member 12. In an alternate embodiment, the hinge passage 76 may terminate within the hinge extension 30. Optionally, the hinge extension 30 may include multiple hinge passages 76 formed therein. In one embodiment, the lock sleeve may be configured to be engaged by the fastener 24 positioned within the fastener orifice 22 formed on the first body member 12, thereby permitting a user to lock the first body member 12 at a selected angle relative to the second body member 14 in another embodiment, the fastener 24 may be configured to engage the lock sleeve 70 thereby locking the amount of force bias being applied by the biasing member 74 to the bearing members 72a, 72b at a pre-set or pre-determined force.

Figure 4:
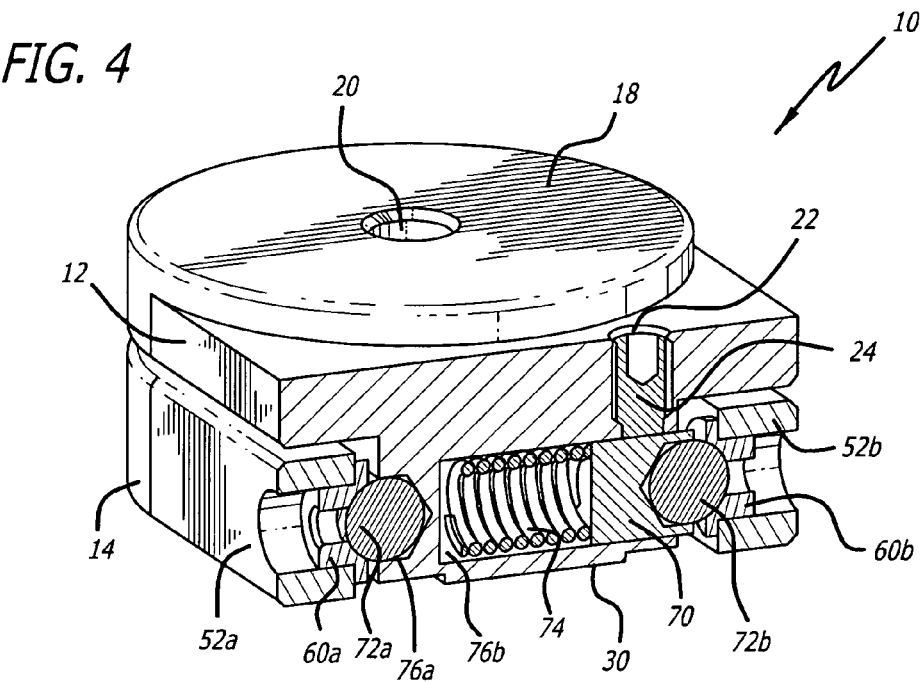
FIG. 4 shows a sectional view of a hinge extension member and hinge recess formed on an embodiment of a kinematic optical mount.

FIG. 4 shows a cross section view of a hinge assembly of an embodiment of an optical mount. As shown, the hinge extension 30 of the first body member 12 is positioned within the hinge recess 44 formed on the second body member 14. The biasing member 74 is engaging a first bearing 72a and a second bearing 70b, all of which being positioned within a hinge passage 76. In the illustrated embodiment, the biasing member 74 comprises a spring. Optionally, any variety of biasing devices may be used, including, for example, springs, silicon materials, elastomers, rubbers, compressible materials, compressible fluids, expanding fluids, expanding materials, and the like. In addition, the biasing member 74 and the second bearing 72b are located within the lock sleeve 70, which is also located within the hinge passage 76. The fastener 24 positioned within the fastener orifice 22 is shown engaging the lock sleeve 70. The fastener 24 may be actuated by the user to engage the lock sleeve 70, thereby restricting the ability of the first body member 12 to move relative to the second body member 14.

Referring again to FIG. 4, the first bearing 72a is shown engaging a first bearing engaging member 60a positioned proximate to or partially within the first hinge relief member 52a. As shown, the first hinge bearing 72a may also be positioned within a first hinge passage 76a formed in the extension body 30. The second bearing member 72b, lock sleeve 70, and biasing member 74 may be positioned within a second hinge passage 76b formed in the extension body 30. The second bearing member 72b is shown engaging the second bearing engaging member 60a positioned proximate to or partially within the second hinge relief member 52b. As shown, when assembled the biasing member 74 applies a constant mechanical biasing force to the bearing member 72b thereby forcing the bearing 72b to engage and be retained within the bearing engaging member 60b. Those skilled in the art will appreciate that the optical mount disclosed herein is much easier to assemble than prior art devices. For example, the mechanical force applied by the biasing member 74 ensures a pre-set or pre-determined load is applied to at least one first and second bearing engaging members 60a, 60b by at least one of the first and second bearing members 72a, 72b. As a result, the assembler may tighten the fastener 24 located within the fastener orifice 22 to ensure that every optical mount 10 is delivered to a customer with substantially the same load at the interface of the bearings 72a, 72b and the bearing engaging members 60a, 60b. Optionally, a biasing member may also be positioned proximate to the bearing member 72a. In another embodiment, the hinge passage 76 may traverse the hinge extension 30 thereby permitting a single biasing member 74 to apply a force to both the first and second hinge bearings 72a, 72b.

Figure 5:
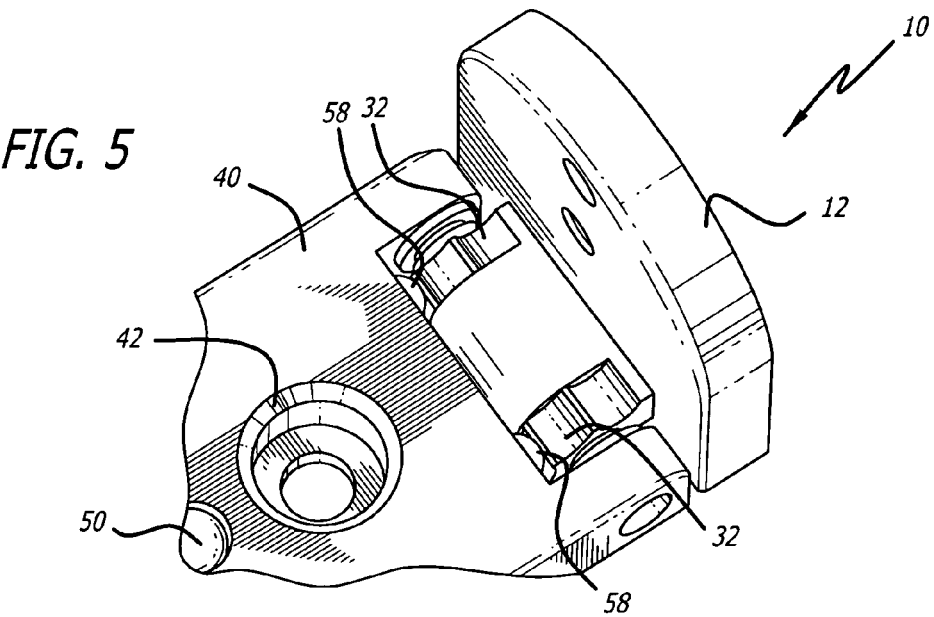
FIG. 5 shows and elevated perspective view of an positioning elements and positioning registers formed on an embodiment of a kinematic optical mount.
Figure 6:
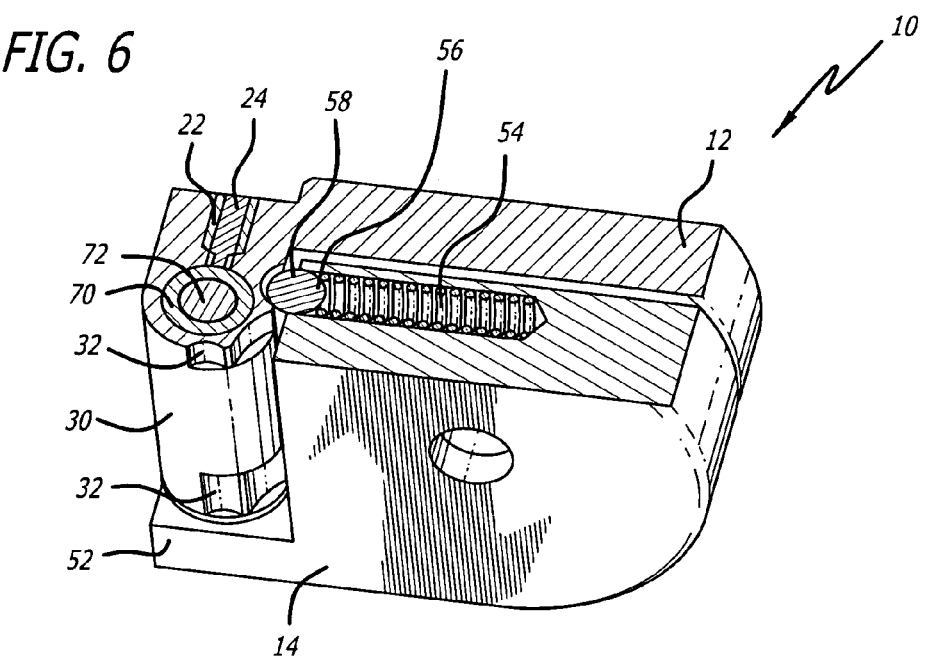
FIG. 6 shows a perspective sectional view of a positioning element formed on second body member engaging a positioning register formed on a first body member of an embodiment of a kinematic optical mount.

FIG. 5 and 6 show an embodiment of the optical mount 10. As shown, the hinge extension 30 includes one or more positioning registers 32 formed thereon. The positioning elements 58, located within the biasing member recesses 56 with the biasing members 54 (See FIG. 3), are shown engaging the positioning registers 32. The biasing members 54 apply a force to the positioning elements 58 thereby forcing the positioning elements 58 to engage the positioning registers 32 with sufficient force to prevent unwanted movement of the first body member 12 relative to the second body member 14. In the illustrated embodiment, the positioning registers 32 are formed on the hinge extension 30 at predetermine locations to ensure the first body member 12 may be positioned at selected angles relative to the second body member 14. For example, the positioning registers 32 may be positioned to ensure that the first body member 12 may be positioned at angles 37.5 degrees, 45 degrees, 60 degrees, or any other angle between 0.1 degree and 90 degrees relative to the second body member 14. In addition, the positioning elements 58 and positioning registers 32 are configured to act as a velocity break to lessen impact during opening and closing of the device. More specifically, the positioning elements 58 and positioning registers 32 require the user to apply an undulating force to the first body member 12 to move the first body member 12 to a fully open (i.e. 90 degrees relative to the second body member 14) or fully closed (i.e. located proximate to the second body member 14) position. As such, the harmful shocks and abrupt movements associated with prior art device may be avoided.

Figure 7:
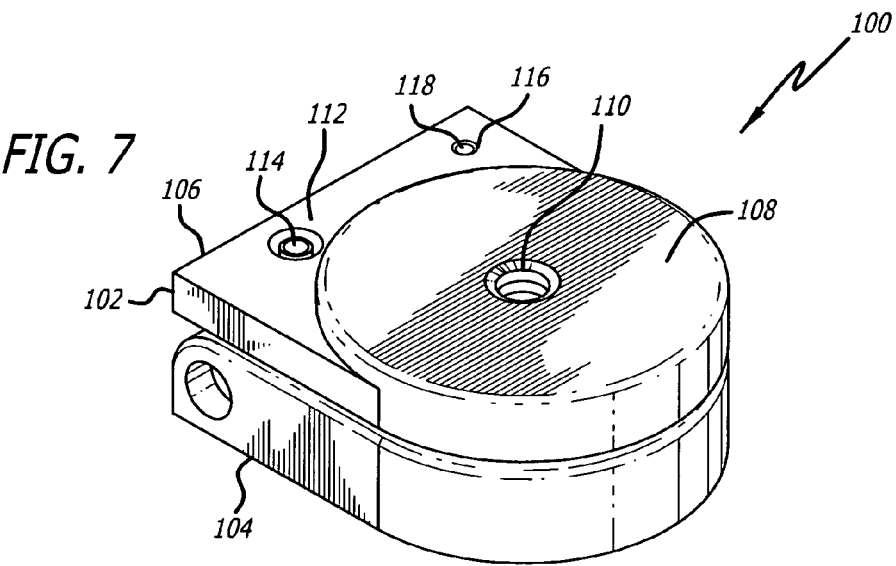
FIG. 7 shows an elevated perspective view of a registering member position on a first body member of an embodiment of a kinematic optical mount.
Figure 8:
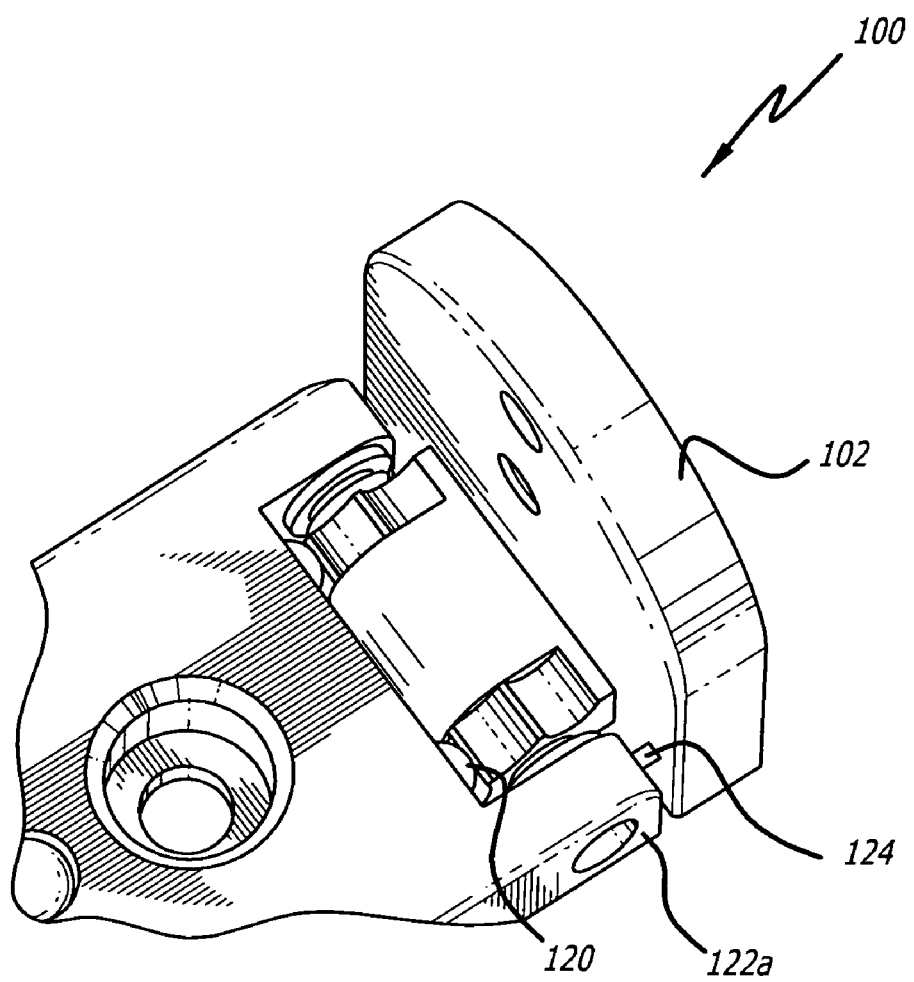
FIG. 8 shows an elevated perspective view of a registering member located on a first body member of an embodiment of a kinematic optical mount engaging a second body member.

FIGS. 7 and 8 show an alternate embodiment of an optical mount. As shown, the optical mount 100 incorporates the elements of the optical mounts described above. The optical mount 100 includes a first body member 102 and a second body member 104. The first body member 102 comprises a mounting body 106 having at least one mounting surface 108 thereon. One or more mounting apertures 110 may be formed on the mounting surface 108. At least one fastener aperture 112 configured to receive at least one fastener 114 therein may be formed on the first body member 102. In addition, the first body member 102 may include one or more registering devices 118 positioned in one or more registering orifices 116 formed thereon. The registering device 118 may be configured to traverse the first body member 102 and engage at least a portion of the second body member 104. As shown in FIG. 8, the registering device may be configured to enable the user to fine tune the angular position of the first body member 102 relative to the second body member 104 when the device is open. As such, the registering device 118 may act as a stop. In one embodiment, the registering device 118 comprises a threaded member. As such, the registering orifice 116 may include one or more threads configured to engage the registering device 118.

The various embodiments disclosed herein are illustrative of the principles of the invention. Other modifications may be employed which are within the scope of the invention. Accordingly, the devices disclosed in the present application are not limited to that precisely as shown and described herein.

What is claimed is:

1. An optical mount, comprising:
   a first body member having at least one hinge extension defining at least one hinge passage extending therefrom and a mount surface configured to receive at least one optical component thereon;
   one or more positioning registers formed on the hinge extension;
   a second body member having a hinge recess sized to receive the hinge extension therein and at least one coupling body;
   one or more positioning elements in communication with the second body member and configured to be force biased to engage the positioning registers; and
   at least one biasing member configured to apply a constant biasing force to one or more hinge bearing members wherein the hinge bearing members are configured to provide at least three points of contact between the hinge bearing members and the second body member, thereby forcing the bearing members to engage at least one bearing engaging member in communication with the second body member thereby coupling the first body member to the second body member.

2. The device of claim 1 wherein the positioning registers comprise one or more recesses configured to receive one or more positioning elements therein.

3. The device of claim 1 wherein the positioning registers comprise holes.

4. The device of claim 1 wherein the positioning registers comprise pins.

5. The device of claim 1 wherein the positioning registers are selected from a group consisting of slits, slots, pins, balls, inductive bodies, and cylindrical body.

6. The device of claim 1 wherein the hinge bearing members comprise spherical bearing.

7. The device of claim 1 wherein the positioning elements and positioning registered are configured to enable the first body member to be securely positioned at any angle between 0 degrees and 90 degrees relative to the second body member.

8. The device of claim 1 further comprising at least one lock sleeve configured to be positioned within the hinge passage and receive the biasing member and a hinge bearing member therein.

9. The device of claim 8 further comprising a fastener in communication with the first body member and configured to selectively engage the lock sleeve.

10. The device of claim 9 further comprising a fastener orifice formed on the first body member and sized to receive the fastener therein.

11. An optical mount, comprising:
   a first body member having at least one hinge extension defining at least one hinge passage extending therefrom and a mount surface configured to receive at least one optical component thereon;
   one or more positioning recesses formed on the hinge extension;
   a second body member having a hinge recess sized to receive the hinge extension therein and at least one coupling body;
   one or more positioning elements in communication with the second body member and configured to be force biased to engage the positioning recesses; and
   at least one biasing member configured to apply a constant biasing force to one or more hinge bearing members wherein the hinge bearing members are configured to provide at least three points of contact between the hinge bearing members and the second body member, thereby forcing the hinge bearing members engage at least one bearing engaging member in communication with the second body member thereby coupling the first body member to the second body member.

12. The device of claim 11 wherein the positioning registers are selected from a group consisting of holes, pins, slits, slots, pins, balls, inductive bodies, and cylindrical body.

13. The device of claim 11 wherein the positioning recesses and positioning registered are configured to enable the first body member to be securely positioned at any angle between 0 degrees and 90 degrees relative to the second body member.

14. An optical mount, comprising:
   a first body member having at least one hinge extension and a mount surface;
   one or more positioning registers formed on the hinge extension;
   a second body member having a hinge recess sized to receive the hinge extension therein and at least one coupling body;
   one or more positioning elements in communication with the second body member and configured to be force biased to engage the positioning registers; and
   at least one biasing member configured to apply a constant biasing force to one or more hinge bearing members wherein the hinge bearing members are configured to provide at least three points of contact between the hinge bearing and the second body member, thereby forcing the hinge bearing members engage at least one bearing engaging member in communication with the second body member thereby coupling the first body member to the second body member.

15. The device of claim 14 wherein the positioning registers are selected from a group consisting of holes, pins, slits, slots, pins, balls, inductive bodies, and cylindrical body.

16. The device of claim 14 wherein the positioning elements and positioning registered are configured to enable the first body member to be securely positioned at any angle between 0 degrees and 90 degrees relative to the second body member.

17. The device of claim 14 wherein the mount surface is configured to have at least optical element coupled thereto.

* * * * *